United States Patent [19]

Suzuki

[11] 4,046,030

[45] Sept. 6, 1977

[54] FINAL DRIVE UNIT

[75] Inventor: Kunihiko Suzuki, Fujisawa, Japan

[73] Assignee: Nissan Motor Co., Ltd., Yokohama, Japan

[21] Appl. No.: 674,186

[22] Filed: Apr. 6, 1976

[30] Foreign Application Priority Data

Apr. 9, 1975 Japan .................................. 50-46991

[51] Int. Cl.² ............................................. F16H 1/38
[52] U.S. Cl. ...................................... 74/710; 64/1 V; 64/11 R; 64/14; 64/27 NM
[58] Field of Search ............... 64/11, 27 NM, 6, 27 R, 64/14, 1 V; 74/710

[56] References Cited

U.S. PATENT DOCUMENTS

| 2,098,703 | 11/1937 | Geyer | 64/11 R |
| 2,952,143 | 9/1960 | Case | 64/11 R |
| 3,062,023 | 11/1962 | Stolworthy | 64/1 V |
| 3,252,301 | 5/1966 | Herrington, Jr. | 64/27 NM |
| 3,485,062 | 12/1969 | Blake | 64/14 |
| 3,901,102 | 8/1975 | Manwaring | 74/710 |

Primary Examiner—Samuel Scott
Assistant Examiner—Randall Heald
Attorney, Agent, or Firm—Frank J. Jordan

[57] ABSTRACT

Driving torque from the propeller shaft is transmitted to the drive pinion which is in constant mesh with the ring gear of the differential assembly while torsional vibration in the drive line is absorbed by the coupler provided in the pinion drive shaft.

8 Claims, 5 Drawing Figures

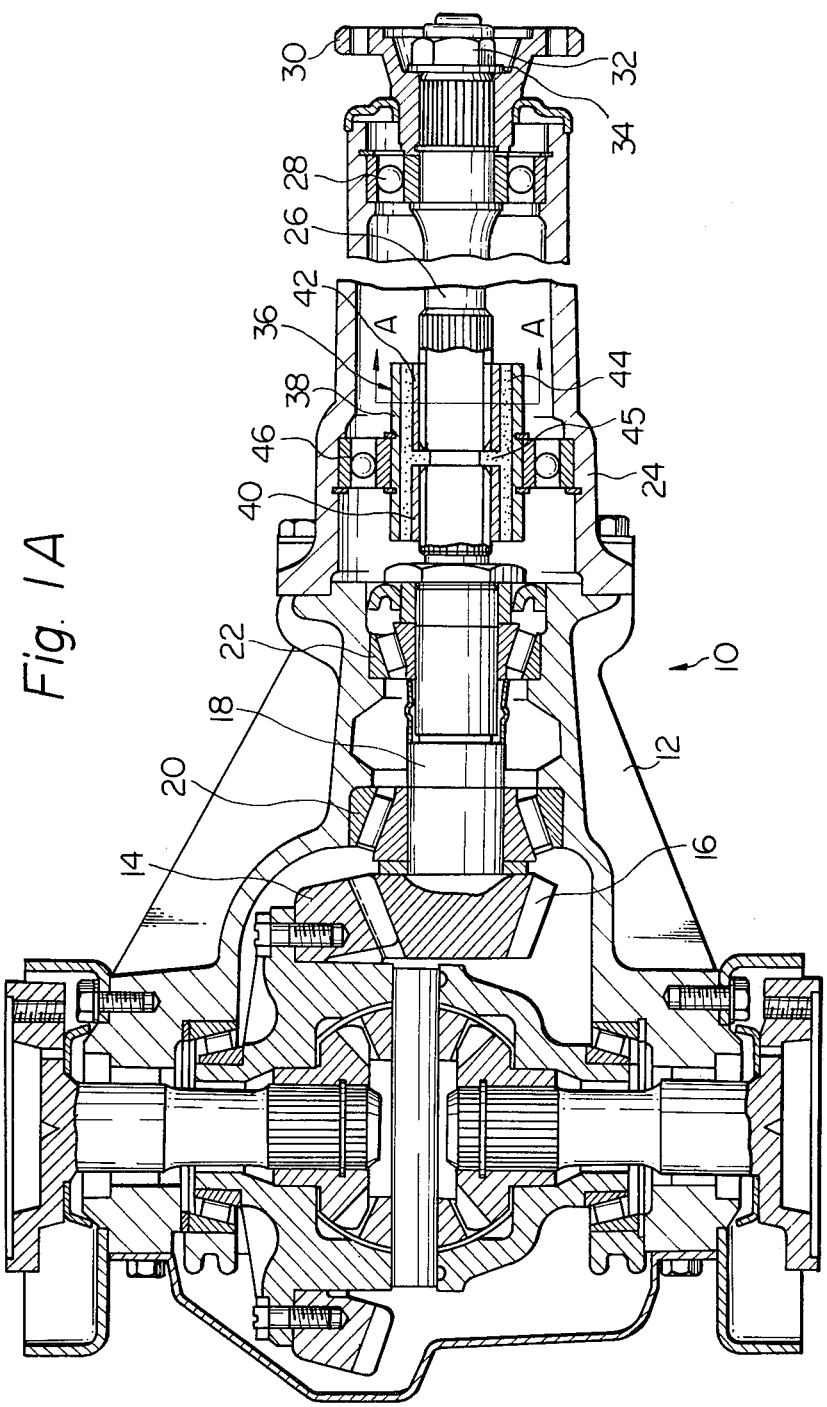

FINAL DRIVE UNIT

The present invention relates to the motor vehicle drive line, and more particularly to the improvement of the final drive unit of the drive line.

The motor vehicle drive line is generally made up of a propeller shaft, final drive unit including a differential mechanism and axles for the vehicle driving wheels and, in effect, transmits engine power from the transmission therethrough. The differential mechanism is effective in distributing engine power to the respective driving wheels to drive the driving wheels via a selected reduction ratio.

During operation of the motor vehicle, especially acceleration and deceleration conditions, torsional stresses occur in the drive line owing to the variation of the driving torque. Such stresses induce in the drive line torsional vibrations and accompanying lateral vibrations.

Such torsional and lateral vibrations have a detrimental effect on the efficiency as well as the life of many of the components of both the propeller shaft and the final drive unit. More particularly, such torsional and lateral vibrations are largely responsible for power losses between the engine and final drive unit, objectionable noise in the operation of the propeller shaft and the final drive unit, and excessive wear of the perishable components of the drive line.

In a majority of drive lines, the propeller shaft is apt to be of considerable length relative to its diameter since the engine is generally mounted at the front side of the vehicle and on the other hand the final drive unit is positioned at the rear end of the motor vehicle. Therefore, the above-mentioned vibrations become intense in such propeller shaft because the critical speed of such propeller shaft is considerably lower than the critical speeds of other components in the drive line and further because the vibration amplitude of a propeller shaft of a given diameter increases as the length increases.

To elevate the critical speed of a propeller shaft there has been proposed a technique to lengthen the pinion drive shaft of the final drive unit thereby shortening the propeller shaft by the length as long as the increased length of the pinion drive shaft.

Such a technique is advantageous for increasing the rigidity of the propeller shaft itself against the lateral force, and therefore to some extent advantageous for reducing the forgoing detrimental effect and drawbacks. However, such a technique torsional vibrations resulting from the torsional stresses in the drive line, therefore such technique cannot satisfactorily overcome the forgoing disadvantages in the drive line.

It is therefore a general object of the present invention to provide a vehicle drive line including an improved final drive unit which can effectively eliminate torsinal vibrations of the drive line or reduce them to some extent of negligible quantity.

It is a more specific object of the present invention to provide a coupling device which can effectively absorb torsional vibrations and which is simple and compact in construction.

It is still another object of the present invention to provide a torsional vibration damping coupler device which has provision for rigidly connecting the driving shaft to the driven shaft when the drive torque exceeds a predetermined value.

Other objects and features of the final drive unit incorporating the improvement according to the present invention will become more apparent from the following description taken in conjunction with the accompanying drawings in which:

FIG. 1A is a sectional view of the final drive unit according to the present invention incorporating an improved pinion drive shaft and a vibration damping coupler;

Figure 1B:
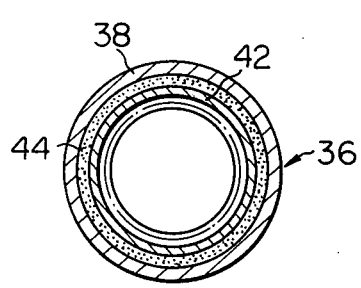
FIG. 1B is an enlarged sectional view of a vibration damping coupler taken on line A—A of FIG. 1A.

Reference will now be made to the drawings, first to FIG. 1A. The reference numeral 10 illustrates a final drive unit in a drive line in a motor vehicle. The final drive unit 10 includes a carrier housing 12 which is supported by the vehicle suspension system (not shown) or fastened to the vehicle body. The carrier housing 12 carries therein a differential ring gear 14 which is in constant mesh with a drive pinion 16. A first differential pinion drive shaft 18 (which will hereinafter be referred to as a first drive shaft) of the drive pinion 16, extending fore-and-aft direction of the vehicle body, is journaled in the carrier housing 12 through front and rear pinion bearings 20 and 22 which are shown as being tapered roller bearings. The first drive shaft 18 carries at its rear end the drive pinion 16 which is in constant mesh with the differential ring gear 14 and at its front end is provided with splines on the exterior surface thereof. The carrier housing 12 is jointed to an extension housing 24, extending in the fore-and-aft direction of the vehicle body, in which a second differential pinion drive shaft 26 (which will hereinafter be referred to as a second drive shaft) is journaled through a bearing 28 located at the front end of the extension housing 24 and arranged so as to be substantially in axial alignment with the first drive shaft 18. The second drive shaft 26 has a front end portion splined to the internally splined opening of a pinion drive flange 30 which is secured around the second drive shaft 26 by means of a pinion drive flange nut 32 through a locker washer 34 and a rear end portion provided with splines. A vibration damping coupler 36 is provided about the first and second drive shafts 18 and 26 for resilient connection therebetween. The vibration damping coupler 36, as shown in FIG. 1A and 1B, comprises an outer tubular housing 38 preferably formed of metal, and inner tubular housings 40 and 42 concentrically arranged with respect to the outer tubular housing 38 and axially spaced from each other and preferably formed of metal. Each of the inner tubular housings 40 and 42 has a substantially cylindrical inner surface provided with splines and an outer surface circumferentially spaced from the inner surface of the outer tubular housing 38 to provide therebetween a chamber having an annular cross-section for accommodating a body of yieldable resilient material 44 such, for example, as rubber or a substance having characteristics similar to rubber. The body of resilient material 44 is bonded both to the inner surface of the outer tubular housing 38 and to the outer surfaces of the inner tubular housings 40 and 42 by either a chemical bond or a frictional bond, or by a combination of the two bonds. The inner tubular housings 40 and 42 are respectively splined to the front end portion of the first drive shaft 18 and the rear end portion of the second drive shaft 26, and the outer tubular housing 38 is rotatably supported in the extension housing 24 through a bearing 46 which is shown as a ball bearing. The body of resilient material 44, as clearly shown, preferably comprises on the inner surface thereof a radially inwardly extruding portion 45 to separate the first and second drive shafts 18 and 26 in the axial direction. With this arrangement, driving torque is transmitted from the propeller shaft through a rear universal joint and the pinion drive flange 30 to the second drive shaft 26 which in turn transmits the driving torque to the first drive shaft 18 by way of the inner tubular housing 42, the body of resilient material 44 and the inner tubular housing 40. During driving torque transmission through the body of resilient material 44, torsional vibrations created by any of the shafts in the drive line including the propeller shaft are advantageously absorbed by the body of resilient material 44 instead of being transmitted to the other shaft in either direction rotation of the propeller shaft. Furthermore, since the torsional damping coupler 36 is advantageously supported by the bearing 46 which in turn carried by the extension housing 24, it advantageously elevates the lateral vibration resonance frequency of the coupled first and second drive shaft.

Figure 2A:
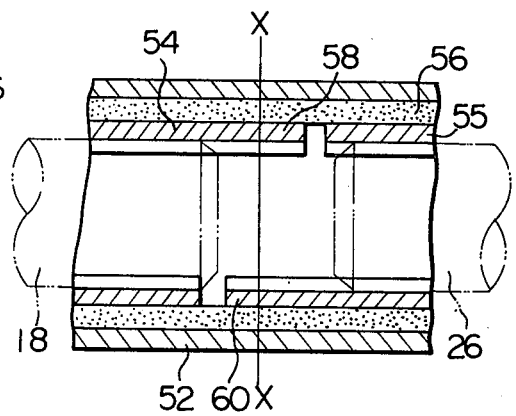
FIG. 2A is a sectional view showing another embodiment of a vibration damping coupler taken on line Y—Y of FIG. 2B.
Figure 2B:
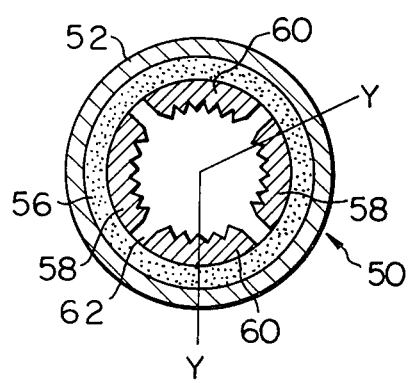
FIG. 2B is a sectional view showing another embodiment of a vibration damping coupler taken on line X—X of FIG. 2A.
Figure 2C:
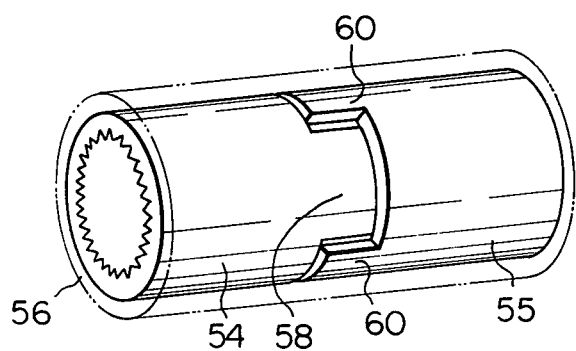
FIG. 2C is a schematic perspective view of another embodiment of a vibration damping coupler similar to those shown in FIGS. 2A and 2B, but with some parts are omitted.

FIGS. 2A, 2B and 2C illustrate another embodiment of a torsional damping coupler 50 according to the present invention. The torsional damping coupler 50 of this embodiment includes an outer tubular housing 52, inner tubular housings 54 and 55, and a body of resilient material 56, which are respectively arranged into a construction substantially similar to the coupler shown in FIGS. 1A and 1B. The body of resilient material 56 resiliently interconnects the outer surfaces of the inner tubular housings 54 and 55 and the inner surface of the outer tubular housing 52 and is bonded thereto in the same manner as was reviously mentioned with respect to FIGS. 1A and 1B. As shown in FIGS. 2A and 2C (FIG. 2C omits the outer tubular housing 52 and the body of resilient material 56 for clear illustration of the arrangement of the inner tubular housings 54 and 55), the inner tubular housings 54 and 55 are respectively provided with axially extending end portions or projections 58 and 60. The projections 58 and 60 are so disposed that the projections 58 respectively extend between the projections 60 and are also concentrically arranged with respect to the outer tubular housing 52. As is shown in FIG. 2B, the arcuate extent of the projections 58 and 60 is predetermined to provide the desired circumferential space 62 between the adjacent sides of the projections. As is shown in FIG. 2A, the inner tubular housings 54 and 55 are respectively provided with internally splined inner surfaces to which the first and second drive shafts are splined.

With this arrangement, the driving torque is transmitted from the propeller shaft through a rear universal joint and the second drive shaft which in turn transmits the driving torque to the torsional vibration damping coupler 50 according to the present invention. The torsional vibration damping coupler 50 transmits the driving torque from the second drive shaft 26 to the first drive shaft 18 through the inner tubular housing 55 splined to the rear end of the second drive shaft 26, the body of resilient material 56 and the inner tubular housing 54 splined to the front end of the first drive shaft 18. The torsional vibrations created by any of the shafts in the drive line are advantageously absorbed by the body of resilient material 56 in the same manner as was mentioned with respect to FIGS. 1A and 1B. As the driving torque transmitted through the drive line increases, the circumferential space 62 decreases as the result of increase of the relative circumferential displacement between the inner tubular housings 54 and 55. When the driving torque transmitted through the drive line exceeds a predetermined value, the circumferentially overlying portions or projections 58 and 60 abut onto each other. The driving torque, at this moment, is transmitted directly from the second drive shaft 26 to the first drive shaft 18 through the projections 58 and 60 of the inner tubular housings 54 and 55 which are respectively splined to the first and second drive shafts 18 and 26. Such a severe compression of the resilient material 56 may temporarily deprive the coupler of the capacity to absorb torsional vibrations in the drive line. However, since such exceedingly large driving torque occurs in the drive line only when the drive line is rotating at lower speeds relative to the available maximum high speed of the drive line, stresses caused by such drive torque do not induce any of the shafts in the drive line to set up torsional vibrations which may cause any harm to the drive line.

From the forgoing description, it will have been understood that according to the present invention the one-piece pinion drive shaft is separated into two pieces of pinion drive shafts to be coupled by a torsional vibration damping coupler whereby the torsional vibrations occuring in the drive line are eliminated or at least reduced to a negligible quantity.

In addition, since the torsional damping coupler is supported by the bearing which is in turn carried by the extension housing, it advantageously elevates lateral vibration the resonance frequency of the coupled two-piece pinion drive shaft.

Furthermore, according to the present invention, it is provided a torsional vibration damping coupler having a rather simple construction, which has the advantages of cheapness and long life besides the ability to effectively absorb torsional vibrations occuring in the drive line.

In addition, the torsional vibration damping coupler according to the present invention preferably includes a provision for positively mechanically connecting the two-piece pinion drive shaft when the drive torque exceeds a predetermined amount.

While only two embodiments of the final drive unit of the present invention have thus far been described and shown, such are merely by way of example and, thus, numerous changes and modifications may be incoperated into such embodiments.

What is claimed is:

1. In a final drive unit of a motor vehicle line, the improvement comprising, in combination, first and second drive shafts substantially in axial alignment with each other and rotatably supported by bearings in a housing, said first drive shaft having a first end portion integrally connected with a drive pinion which is in constant mesh with a ring gear and a second end portion, said second drive shaft having a first end portion interlockingly connected with a pinion drive flange which is rotatably driven by a rear universal joint and a second end portion, a vibration damping coupler for resiliently coupling the second end portion of said first drive shaft with the second end portion of said second drive shaft, and bearing means rotatably supporting said vibration damping coupler in said housing.

2. The improvement as claimed in claim 1, in which said bearing means comprises at least one bearing in said housing rotatably supporting said vibration damping coupler in said housing.

3. The improvement as claimed in claim 1, in which said vibration damping coupler comprises an outer tubular housings, a pair of inner tubular housing each concentrically arranged with respect to said outer tubular housing and axially spaced from each other, each of said inner tubular housings being respectively connected to said first and second drive shafts, and a body or resilient material resiliently interconnecting between the outer surfaces of said inner tubular housings and the inner surface of said outer tubular housing.

4. The improvement as claimed in claim 3, wherein each of said first and second drive shafts respectively comprises splines on the second end portion thereof, and each of said inner tubular housings respectively comprises splines on the inner surface thereof.

5. The improvement as claimed in claim 3, in which said body of resilient material comprises on the inner surface thereof a radially inwardly extending flange separating said first and second drive shafts from each other in the axial direction.

6. The improvement as claimed in claim 3, in which a pair of said inner tubular housings respectively have axially extending end portions which circumferentially overlie and are spaced from each other to abut onto each other when the relative circumferential displacement between said inner tubular housings is above a certain value.

7. The improvement as claimed in claim 1 wherein said pair of inner tubular members are axially spaced from one another, said body of resilient material having a radially inwardly extending portion extending into the space between said inner tubular members, said first and second drive shafts having their respective second end portions axially spaced from one another, said radially inwardly extending portion of said body of resilient material extending into the space between said first and second drive shaft.

8. The improvement as claimed in claim 1 wherein said housing comprises a carrier housing and an extension housing mounted on the carrier housing, first bearing means rotatably supporting said first drive shaft in said carrier housing, second bearing means rotatably supporting said second drive shaft in said extension housing, and third bearing means rotatably supporting said vibration damping coupler in said extension housing.

* * * * *